Patented Mar. 16, 1948

2,437,938

UNITED STATES PATENT OFFICE 2,437,938

CATALYTIC OXIDATION OF SUBSTITUTED PYRIDINE BASES

Francis E. Cislak and William R. Wheeler, Indianapolis, Ind., assignors to Reilly Tar & Chemical Corporation, Indianapolis, Ind., a corporation of Indiana No Drawing. Application May 31, 1941, Serial No. 396,175

7 Claims. (Cl. 260—295.5)

Our invention relates to the catalytic oxidation of substituted pyridine bases.

It is known that certain substituted pyridine bases in which the substituent and the pyridine nucleus are linked through a carbon-carbon bond may be oxidized in the liquid phase by oxidizing agents such as potassium permanganate to form pyridinecarboxylic acids.

For instance, picolines and lutidines can be so oxidized in liquid phase by potassium permanganate.

We have now found it possible to oxidize such substitued pyridine bases in vapor phase to form such pyridinecarboxylic acids and other partial-oxidation products, by catalytic partial oxidation with a mildly oxidizing oxygen-containing gas, such for instance as air, mixed steam and air, or mixed carbon dioxide and oxygen.

Oxidation catalysts which have been found effective to produce the partial-oxidation are the oxides of the elements of the A subgroups of groups V and VI of the periodic system, either singly or mixed one with another. The catalytic effectiveness of these oxides may be varied by the addition of other oxides, such for instance as oxides of iron, nickel, manganese, or chromium.

We prefer to carry out our invention in continuous process. In so doing, we mix the substituted pyridine base with the mildly oxidizing oxygen-containing gas, desirably air, and pass the resultant mixture over the oxidation catalyst, while maintaining suitable oxidation temperature. Any suitable apparatus for doing this may be used.

The mixture that is passed over the oxidation catalyst desirably contains a great excess of air (or other mildly oxidizing oxygen-containing gas)—preferably several times as much as is necessary for the oxidation. The temperature is an elevated temperature, in comparison with room temperature; but varies with the nature of the catalyst and the nature of the substituted pyridine base to be oxidized, and is controlled to give the desired partial oxidation and to prevent total combustion. This temperature is usually in the range between 250° and 500° C.; but the optimum temperature must be determined in each case by analysis of the product, and the temperature lowered if much carbon dioxide appears and raised if neither carbon dioxide nor the desired pyridine-carboxylic acid or other partial-oxidation product appears.

We have found one excellent catalyst to be a vanadium pentoxide catalyst prepared as follows:

A hot aqueous suspension of ammonium vanadate is sprayed on to small granules of silica, desirably between sand-grain size and pea size, which are heated well above 100° C. After the spraying, the coated granules are calcined in air at about 400° C. for several hours.

These coated and calcined granules are placed in steel tubes in which the oxidation reaction is to take place, and the oxygen-containing gas is passed through such steel tubes.

Example 1

We vaporize 3-picoline, mix it with about 30 times its weight of air, and heat (either before or after the mixing) to about 400° C. This hot mixture of air and 3-picoline is passed over the catalyst at a space velocity of about 2000, with the catalyst and the mixture of gases maintained at about 400° C. in any suitable manner. (By space velocity we mean the total volume of gas, measured at standard temperature and pressure, which passes through the tube per hour, divided by the volume of the catalyst.) As the mixture of air and 3-picoline passes over the catalyst, partial oxidation occurs, to produce 3-pyridinecarboxylic acid—otherwise called nicotinic acid. The 3-pyridinecarboxylic acid thus produced is separated from any co-present material in any suitable manner.

Example 2

Example 1 is repeated, save that instead of using 3-picoline we use 4-picoline. The proportions may be about the same; but the temperature is desirably somewhat lower, for best results of the order of 350° C., although that is not necessary; and the space velocity may be materially higher, of the order of 2500 to 4000. The partial oxidation produces 4-pyridinecarboxylic acid—otherwise called isonicotinic acid.

Example 3

The procedure of Example 1 or Example 2 is repeated, save that instead of using 3-picoline or 4-picoline we use 2-picoline. Here again the proportions are conveniently about the same as given for Example 1, but the temperature is desirably of the order of 340° to 375° C., and the space velocity is desirably about 3000. Partial oxidation occurs, but we have not determined the exact nature of the reaction product.

Example 4

Instead of using picolines, we may use lutidines. For example, we may use 2,6-lutidine. This is vaporized, mixed with about 25 to 40 parts by weight of air, and passed over the catalyst at a temperature of about 400° C. and a space velocity of about 2000. Partial oxidation occurs, but here again we have not determined the exact nature of the reaction product.

Example 5

Instead of using a single substituted pyridine base, we may in some instances use mixtures of substituted pyridine bases. While the substituted pyridine bases in such a mixture may not yield to partial oxidation under the same conditions or at the same rate, yet we can by the general procedures of Examples 1 to 4 get mixtures of pyridinecarboxylic acids and other partial-oxidation products in this manner. However, in treating some mixtures of substituted pyridine bases by our procedure, we run into certain selective actions which are the specific subject-matter of our co-pending application Serial No. 396,174, filed May 31, 1941, now Patent No. 2,300,741, granted November 3, 1942.

*Example 6*

We vaporize nicotine, mix it with 30 to 60 times its weight of air, and heat the mixture to about 450° C. This hot mixture of nicotine and air is passed over the vanadium pentoxide catalyst described previously, at a space velocity of about 4000, with the catalyst and the mixture of gases maintained at about 450° C. in any suitable manner. Partial oxidation of the nicotine takes place, to produce nicotinonitrile (3-pyridinecyanide). This may be recovered by cooling, to condense the nicotinonitrile, and/or by scrubbing the gases, as with water, to take up the nicotinonitrile. This nicotinonitrile is readily transformed into nicotinic acid by heating with a mineral acid, such as hydrochloric acid or sulfuric acid. The partial oxidation of nicotine, as set forth in this Example 6, is claimed in our divisional application Serial No. 768,706, filed August 14, 1947.

*Example 7*

In any of the foregoing Examples 1 to 6, we may vary the catalyst. For instance, we may use a vanadium-iron catalyst; which is conveniently prepared by mixing an aqueous solution of ferric nitrate with an aqueous solution of vanadyl nitrate, in approximate molar proportions of about 1 to 24, and spraying it on to small inert granules, conveniently of silica, maintained at above 100° C.; and then calcining the sprayed granules in air, at about 400° C., for several hours.

We find that this vanadium-iron catalyst is rather more stable than the simple vanadium catalyst first referred to, in that it has less tendency to deteriorate in use.

Instead of a vanadium or vanadium-iron catalyst we may use a molybdenum catalyst or a chromium catalyst or a tungsten catalyst, prepared in the same general way as the vanadium catalysts; or may use other composite catalysts, such as vanadium-chromium, vanadium-molybdenum, chromium-tungsten, etc. In all these instances the actual catalysts will be the oxides of the metals named.

We claim as our invention:

1. The process of producing a pyridine carboxylic acid by partial oxidation of an alkyl pyridine, which consists in subjecting the alkyl pyridine to partial oxidation in vapor phase with a mildly oxidizing oxygen-containing gas at elevated temperature in comparison with room temperature, in the presence of an oxidation catalyst essentially comprising an oxide of an element of the A sub-groups of groups V and VI of the periodic system, and in the absence of substantial quantities of contaminants which oxidize selectively with relation to the alkyl pyridine, and recovering the thus produced pyridine carboxylic acid.

2. The process of producing a pyridine carboxylic acid by the partial oxidation of a picoline, which consists in subjecting the picoline to partial oxidation in vapor phase with a mildly oxidizing oxygen-containing gas at elevated temperature in comparison with room temperature, in the presence of an oxidation catalyst essentially comprising an oxide of an element of the A sub-groups of groups V and VI of the periodic system, and in the absence of substantial quantities of contaminants which oxidize selectively with relation to the picoline, and recovering the thus produced pyridine carboxylic acid.

3. The process of producing a pyridine carboxylic acid by the partial oxidation of a lutidine, which consists in subjecting the lutidine to partial oxidation in vapor phase with a mildly oxidizing oxygen-containing gas at elevated temperature in comparison with room temperature, in the presence of an oxidation catalyst essentially comprising an oxide of an element of the A sub-groups of groups V and VI of the periodic system, and in the absence of substantial quantities of contaminants which oxidize selectively with relation to the lutidine, and recovering the thus produced pyridine carboxylic acid.

4. The process of making nicotinic acid, which consists in subjecting 3-picoline to partial oxidation in vapor phase with air at elevated temperature in comparison with room temperature, in the presence of an oxidation catalyst essentially comprising an oxide of an element of the A sub-groups of groups V and VI of the periodic system, and in the absence of substantial quantities of contaminants which oxidize selectively with relation to the 3-picoline and recovering the thus produced nicotinic acid.

5. The process of making isonicotinic acid, which consists in subjecting 4-picoline to partial oxidation in vapor phase with air at elevated temperature in comparison with room temperature, in the presence of an oxidation catalyst essentially comprising an oxide of an element of the A sub-groups of groups V and VI of the periodic system, and in the absence of substantial quantities of contaminants which oxidize selectively with relation to the 4-picoline and recovering the thus produced isonicotinic acid.

6. The process of producing partial oxidation of substituted pyridine bases as set forth in claim 1, with the addition that the oxidation catalyst essentially comprises an oxide of vanadium.

7. The process of producing partial oxidation of substituted pyridine bases as set forth in claim 1, with the addition that the oxidation catalyst essentially comprises oxides of vanadium and iron.

FRANCIS E. CISLAK.
WILLIAM R. WHEELER.

REFERENCES CITED

The following references are of record in the file of this patent:

UNITED STATES PATENTS

| Number | Name | Date |
| --- | --- | --- |
| 2,267,734 | Henke | Dec. 30, 1941 |
| 2,300,741 | Cislak | Nov. 3, 1942 |

FOREIGN PATENTS

| Number | Country | Date |
| --- | --- | --- |
| 17,003 | Great Britain | 1913 |

OTHER REFERENCES

Groggins "Unit Process in Organic Synthesis," p. 325 (1935), (McGraw-Hill).

Sabatier, "Catalysis in Organic Chemistry," pp. 257–260 (1923).